United States Patent [19]

Grandey

[11] Patent Number: 4,460,185
[45] Date of Patent: Jul. 17, 1984

[54] SEAL INCLUDING A NON-METALLIC ABRADABLE MATERIAL

[75] Inventor: Max F. Grandey, Monroe, Ohio

[73] Assignee: General Electric Company, Cincinnati, Ohio

[21] Appl. No.: 410,783

[22] Filed: Aug. 23, 1982

[51] Int. Cl.³ .................. F16J 15/16; F16J 15/44; F01D 11/08
[52] U.S. Cl. .................................... 277/53; 277/228; 277/DIG. 6; 415/174
[58] Field of Search .................. 415/174; 416/174; 277/53, DIG. 6, DIG. 10, 228

[56] References Cited

U.S. PATENT DOCUMENTS

| Re. 30,600 | 5/1981 | Long et al. | 415/174 X |
|---|---|---|---|
| 2,840,343 | 6/1958 | Brandt, Jr. et al. | 415/174 |
| 2,951,721 | 9/1960 | Asp | 277/DIG. 6 X |
| 2,998,991 | 9/1961 | Spencer | 415/174 X |
| 3,512,790 | 5/1970 | Mancel | 277/96.2 X |
| 3,547,455 | 12/1970 | Daunt | 277/96 |
| 3,799,128 | 3/1974 | Small | 415/174 X |
| 4,207,024 | 6/1980 | Bill et al. | 415/174 |
| 4,257,735 | 3/1981 | Bradley et al. | 277/53 X |

FOREIGN PATENT DOCUMENTS 852887 11/1960 United Kingdom ............... 415/174

*Primary Examiner*—Robert S. Ward
*Attorney, Agent, or Firm*—Lee H. Sachs; Derek P. Lawrence

[57] ABSTRACT

An abradable seal member, which can be a component of a rotary seal in juxtaposition with another member, includes a non-metallic abradable material comprising a halogenated hydrocarbon, for example Teflon material. Such a material, which preferably is porous, has a solids content of at least about 40 weight %, a heat of combustion of no more than about 4000 BTU per pound, the halogenated hydrocarbon being at least about 60 weight % halogen.

14 Claims, 3 Drawing Figures

U.S. Patent   Jul. 17, 1984   4,460,185
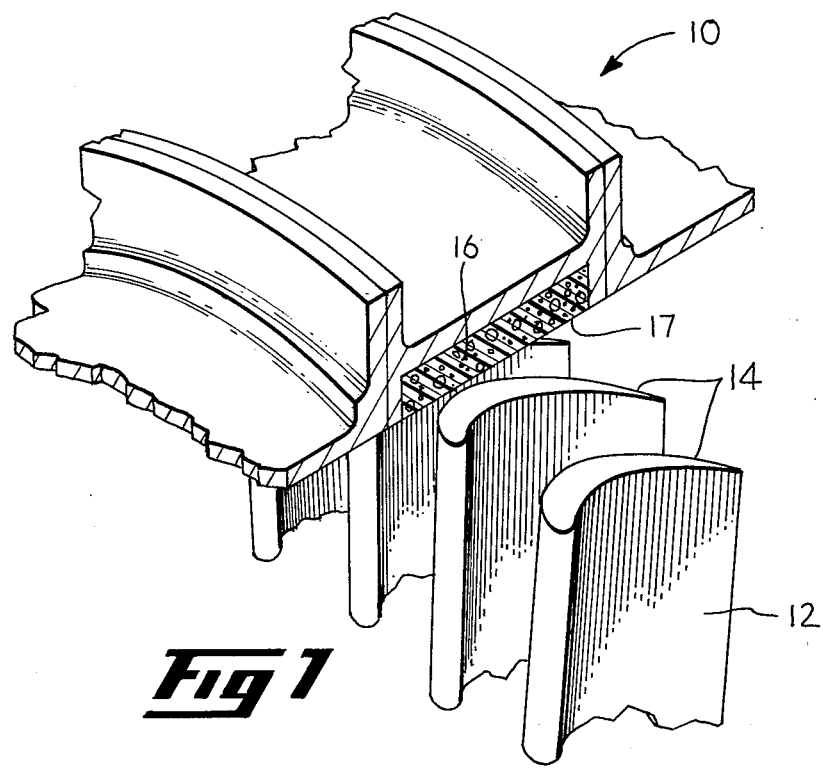
Fig 1
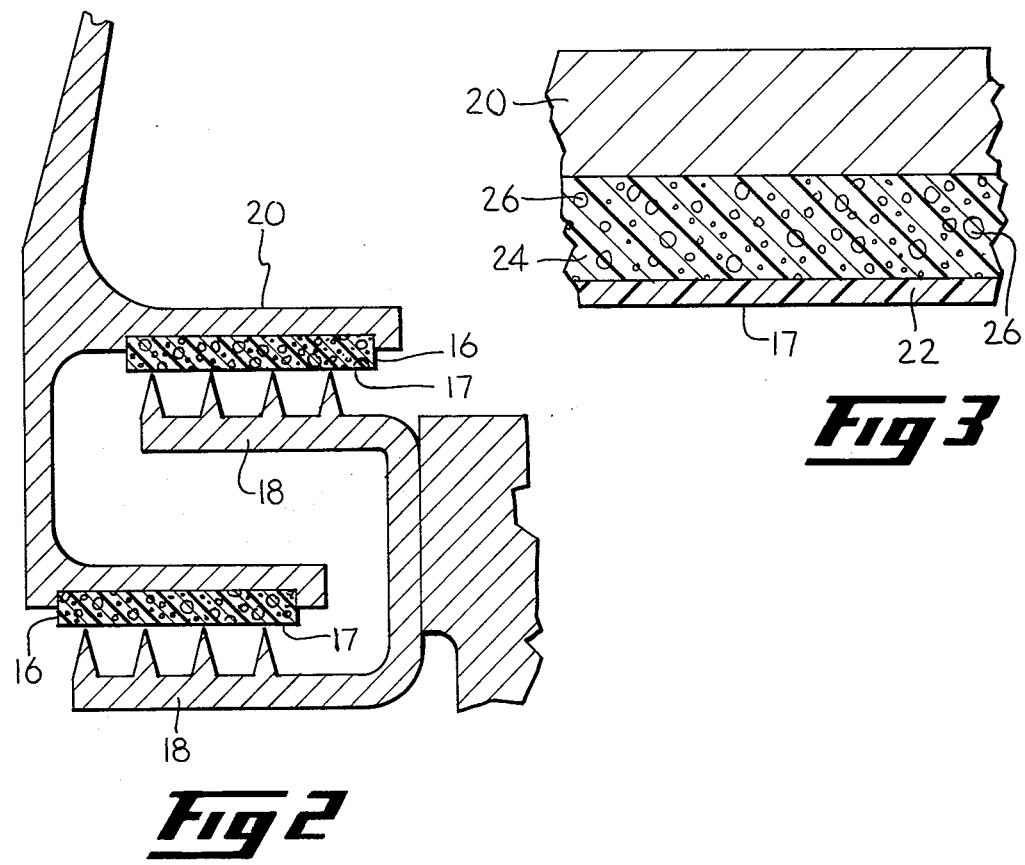
Fig 3
Fig 2

SEAL INCLUDING A NON-METALLIC ABRADABLE MATERIAL

BACKGROUND OF THE INVENTION

1. Field of the Invention

This invention relates to abradable seals and seal materials and, more particularly, to an improved non-metallic abradable seal including a halogenated hydrocarbon.

2. Description of the Prior Art

The efficiency of a gas turbine engine is dependent, at least in part, upon avoidance of air leakage between rotating and stationary members. For example, in the forward operating portions of a gas turbine engine in which incoming air is compressed by rotating blading members in juxtaposition with shrouds, a variety of sealing means have been used to avoid leakage of the compressed or higher pressure air forward in the engine to a lower pressure zone. Such sealing means have included metallic structures such as honeycomb, labyrinth seal teeth and metallic fibrous or porous type members. In addition, organic abradable materials as are described in U.S. Pat. No. 3,547,455—Daunt, patented Dec. 15, 1970 and high temperature oxide materials such as are described in U.S. Pat. No. 3,339,933—Foster, patented Sept. 5, 1967, have been used. Such use can be at or in juxtaposition with the outer tips of rotating blades, in cooperation with various midspan members, in cooperation with labyrinth seal teeth, etc.

In the cooler operating portions of a gas turbine engine it is convenient to use a lower temperature operating seal such as might be made from an organic lightweight abradable material. Such a material has performed very well as an abradable material under normal engine operating conditions. However, in the case of an engine unbalance, relatively large quantities of such an organic material can be abraded rapidly and carried as a combustible product into the higher temperature operating sections of the engine. This can result in fire and engine damage due to a rapid energy release.

SUMMARY OF THE INVENTION

One object of the present invention is to provide a lightweight abradable seal member which combines the characteristics of having a relatively low heat of combustion and resistance to erosion from fluid, such as air, passing over its surface.

Another object is to provide a rotary seal including such an abradable seal member for use in cooperation with a juxtapositioned projection which cooperates with the abradable seal member to provide a fluid pressure drop.

These and other objects and advantages will be more fully understood from the following detailed description of the preferred embodiments and the drawing, all of which are intended to be typical of rather than in any way limiting on the scope of the present invention.

Brifely, one form of the present invention is an abradable seal member which comprises a base member and a porous non-metallic abradable member secured with the base member. The abradable member comprises a halogenated hydrocarbon with at least about 60 weight % of a halogen, preferably fluorine, a solids content of 50–90 weight %, and a heat of combustion of no more than about 4,000 BTU per pound.

Another form of the present invention is as a rotary seal comprising a first member and a second member disposed in juxtaposition and adapted for relative movement in respect one to the other. Secured with the first member is a non-metallic abradable material of the above-described halogenated hydrocarbon. The second member includes at least one projection directed toward the abradable material on the first member and cooperating with a surface of the abradable material to provide a fluid, such as air, pressure drop seal between the members.

BRIEF DESCRIPTION OF THE DRAWING

FIG. 1 is a perspective, fragmentary, partially sectional view of blading members cooperating with a shroud which includes an abradable seal portion;

FIG. 2 is a fragmentary sectional view of a labyrinth type seal which includes a non-metallic abradable seal portion; and FIG. 3 is another form of the abradable material associated with the present invention.

DESCRIPTION OF THE PREFERRED EMBODIMENTS

Ingestion of relatively large quantities of an organic abradable seal material, for example, an epoxy resin filled with hollow phenolic microspheres, into a higher temperature operating component of a gas turbine engine has resulted in damage due to rapid energy release. This indicated the need to replace such abradable material with one which has a lower heat of combustion. Replacement of the organic abradable material with an open-faced honeycomb resulted in decreased engine efficiency. It was recognized that a replacement material would have to have significantly lower weight content of carbon and hydrogen to meet the required lower heat of combustion. Also it preferably would be of a lower density than a metallic material while retaining the abradability, erosivity characteristics of an organic material. In addition, it was desirable that it be easily manufactured and repaired after normal wear.

It has been recognized, according to this invention, that a class of materials which had been used for its relatively low friction characteristics could be used for an abradable material because of its low weight percent of carbon and hydrogen. This class of materials is the halogenated hydrocarbon the most common form of which is commercially available as a tetrafluoroethylene. Commercial versions are identified as Teflon material or Kel-F material. The present invention recognizes that such a halogenated hydrocarbon with at least about 60 weight % halogen has a sufficiently low weigh of carbon and hydrogen to meet the heat of combustion requirements for application as an abradable seal portion.

Although a solid halogenated hydrocarbon can be used in such an application, it is preferable, according to the present invention to use a porous halogenated hydrocarbon material to provide a lower density, lower weight material for aircraft applications. The above-described specific examples of tetrafluoroethylene are the preferred commercial form because they contain fluorine in the range of about 70–80 weight % and a heat of combustion of about 2200 BTU per pound. Density of such material in the solid form is about 135 pounds per cubic foot although a satisfactory density of about 70–75 pounds per cubic foot can be achieved in a tetrafluoroethylene having about 50% solids and 50% voids, by volume, with the voids being mostly connecting. During the evaluation of the present invention, it has been recognized that a solids content of less than about 40% results in erosion characteristics undesirable for use in the present invention.

During the evaluation of the present invention, porous Teflon material was obtained commercially for evaluation in connection with the present invention. The density of such material was found to be 70-75 pounds per cubic foot as determined by weighing in air and water. Heat of combustion as determined by a Parr Bomb method was 2200 BTU/lb. The excellent erosion resistance of such material was determined using $Al_2O_3$ grit, having an average praticle size of 56 microns, directed from a nozzle onto a test specimen under 28 psi, with the nozzle at a 20° angle and 4 inches from the specimen. Normalized erosion for this particular specimen was found to be from 1.74 to 1.93 sec/mil for specimens ranging in density from about 71-77 lbs/$ft^3$.

In connection with abradability, alloy blades and labyrinth seals were rubbed against porous Teflon material specimens at rub rates from 0.1 mls/sec to a 100 mil plunge were made into the specimen with no measurable wear of the tips of the blades or seals contacting the specimen.

In order to determine the fire or explosive characteristics of the abradable seal material, Teflon powder (−600 mesh) was placed in a Hartman tube at 19 psig in the presence of a high frequency arc. There was no ignition of the Teflon powder and no pressure increase. In another evaluation, the same size Teflon powder was injected into a flame tunnel operating at 1000° F. at 200 psig with an auto-ignition environment. There was no ignition of the Teflon powder and no pressure increase.

From these data, it was recognized that a halogenated hydrocarbon, as represented by a tetrafluoroethylene material having a fluorine content of at least about 60 weight % can function as an abradable seal material in a gas turbine engine environment up to a temperature where it begins to decompose significantly, for example at about 650° F. The selection of density of the commercially available porous material such as porous Teflon material depends on the intended application. It has been found that porous Teflon can be machined readily, for example using a single point high speed tool with a positive rake of 10° with a speed of 300-500 surface feet per minute and a feed of about 0.003 inch per pass. If desired, the machined surface can be made smoother by lightly burnishing with an abrasive cloth.

A number of well known means can be used for securing such a halogenated hydrocarbon to a base or backing member such as an element of a shroud or seal. In addition to mechanical means are a variety of bonding materials such as epoxy resins, polyimide resins, etc., depending on the intended temperature of application. Because the halogenated hydrocarbon is intended to be abraded, the bond strength to the halogenated hydrocarbon with or without surface preparation when using such adhesive materials generally is stronger than the halogenated hydrocarbon itself. It desired and convenient for manufacture, adhesive films of appropriate materials can be used for such bond. Assembly can be attained in a conventional manner used in the art such as using a vacuum bag along with appropriate pressure and temperature. Such methods have been used for a long period of time in the bonding of various materials such as plastics to plastics or plastics to metals. In one specific example, a porous Teflon material approximately 0.150 inch thick was bonded to a metal shroud member with an epoxy adhesive resin supported film, forms of which are commercially available as Metl Bond 328 material or Hysol EA9649 R material.

With reference to the drawing, FIG. 1 is a perspective, fragmentary, partially sectional view of a rotary seal in the form of a first or base member such as a shroud 10 cooperating with blading members 12, the members being adapted for relative movement in respect one to the other, for example rotation of the blading members 12. Blading members 12 include projections or tip portions 14 directed toward and in juxtaposition with porous, abradable halogenated hydrocarbon material 16 having a surface 17. As has been described above, such material can be secured with the metal backing portions of the first member by adhesives and bonding materials as well as by mechanical securing means, if desired. During operation of such members, the projections or blade tips 14 and the surface 17 of porous abradable member 16 move in juxtaposition relative one to the other to provide an air pressure drop seal between the members.

Another form of the invention as shown in FIG. 2 is a fragmentary sectional view of a labyrinth type seal. The above-described non-metallic abradable material in the form of a porous halogenated hydrocarbon is provided at 16, secured with a first member 20 in juxtaposition and in cooperation with the projections or teeth of labyrinth member 18 to provide a rotary seal.

As was mentioned above, the non-metallic abradable member associated with the present invention can be in the form of a composite non-metallic structure including a solid substantially void-free outer or surface portion or film shown at 22 in the fragmentary sectional view of FIG. 3 secured with an inner portion 24 in the form of a porous structure having pores 26, all of which is secured with a base or first member 20. The composite abradable structure of FIG. 3 can be provided using the above-described porous halogenated hydrocarbon, such as Teflon material, over which the film or sheet 22 can be bonded. A diffusion bond can be achieved by pressing the materials together under pressure in the range of about 10-25 psi and a temperature of about 500-700° F.

Such an arrangement as is shown in FIG. 3 improves further the erosion resistance of the abradable halogenated hydrocarbon material which, for weight saving reasons, may include as much as 60 volume % voids. As can be appreciated by those skilled in the art, the thickness of the abradable members is not critical because it is the surface portion which is to be abraded. Therefore, the thickness of material is selected for the application. During the evaluation of the present invention, thickness is in the range of about 0.03-0.20 inch were tested.

Although the present invention has been described in connection with specific examples and embodiments, it will be recognized by those skilled in the art the variations and modifications of which the present invention is capable within its scope as defined by the appended claims.

What is claimed is:

1. A gas turbine engine rotary seal comprising:
   a first member and a second member disposed in juxtaposition and adapted for relative movement with respect one to the other;
   a porous non-metallic abradable material secured at a surface of the first member and consisting essentially of:

(a) a halogenated hydrocarbon with at least about 60 weight % halogen;
(b) a solids content of about 50–90 weight %; and
(c) a heat of combustion of no more than about 4,000 BTU per pound;
the second member including at least one projection directed toward the abradable material on the first member and cooperating with a surface of the abradable material to provide a fluid pressure drop seal between the members.

2. The rotary seal of claim 1 in which the halogen is fluorine.

3. The rotary seal of claim 2 in which the fluorine is included in the range of about 70–80 weight %.

4. The rotary seal of claim 2 in which the halogen is in the form of tetrafluoroethylene.

5. The rotary seal of claim 1 in which the abradable material is a composite structure comprising:
an inner portion and a surface portion, each portion being a form of the non-metallic abradable material;
the inner portion being the porous abradable material secured with the first member; and
the surface portion being a substantially void-free form of the material secured with the inner portion.

6. A gas turbine engine abradable seal member comprising:
a base member; and
a porous non-metallic abradable member secured with the base member and consisting essentially of: (a) a halogenated hydrocarbon with at least about 60 weight % halogen; (b) a solids content of about 50–90 weight %; and (c) a heat of combustion of no more than about 4,000 BTU per pound.

7. The member of claim 6 in which the halogen is fluorine.

8. The member of claim 7 in which the fluorine is included in the range of about 70–80 weight %.

9. The member of claim 7 in which the halogen is in the form of tetrafluoroethylene.

10. The member of claim 6 in which the member is a composite structure comprising:
an inner portion and a surface portion, each portion being a form of the non-metallic abradable material;
the inner portion being the porous abradable material secured with the first member; and
the surface portion being a substantially void-free form of the material secured with the inner portion.

11. The rotary seal of claim 1 in which:
the first member is a gas turbine engine stationary shroud; and
the second member comprises a plurality of gas turbine engine rotating blading members each including a tip portion as the projection directed toward and in juxtaposition with the non-metallic abradable material secured at a surface of the first member.

12. The rotary seal of claim 11 in which the non-metallic abradable material secured at a surface of the first member has secured thereto a surface portion of a substantially void-free form of said abradable material.

13. The rotary seal of claim 1 in the form of a labyrinth type seal in which the second member includes a plurality of teeth in juxtaposition and in cooperation with a non-metallic abradable material secured with the first member.

14. The rotary seal of claim 13 in which the non-metallic abradable material secured at a surface of the first member has secured thereto a surface portion of a substantially void-free form of said abradable material.

* * * * *